United States Patent [19]
Demange

[11] 3,755,000
[45] Aug. 28, 1973

[54] ELECTRODES AND FUEL CELLS

[75] Inventor: Philippe Demange, Chatenay-Malabry, France

[73] Assignee: Society Generale De Constructions Electriques et Mecaniques (Alsthom), Paris, France

[22] Filed: Dec. 1, 1971

[21] Appl. No.: 203,773

[30] Foreign Application Priority Data
Dec. 12, 1970  France.............................. 70/43603

[52] U.S. Cl........... 136/86 D, 136/120 FC, 204/280
[51] Int. Cl. ......................................... H01m 27/00
[58] Field of Search.......... 136/86 D, 86 R, 120 FC, 136/120, 145, 159, 160; 204/253, 254, 268, 280, 180 P

[56] References Cited
UNITED STATES PATENTS
686,886  11/1901  Chamberlain...................... 136/145
3,589,942  6/1971  Leitz et al......................... 136/86 D Primary Examiner—A. B. Curtis
Assistant Examiner—H. A. Feeley
Attorney—Robert D. Flynn et al.

[57] ABSTRACT

An improved electrode structure wherein the electrode is a non-porous embossed sheet. The electrode surface contains a plurality of projections arranged in bands. Each band occupies an area and the top and bottom of the band are substantially parallel to one of the margins and substantially perpendicular to the direction of contemplated fluid flow across the electrode. Each band of projections is an array of parallel elongated ridges inclined to said direction of fluid flow. The angle of said inclination is such that $d \sin \alpha = ne$, wherein $d$ is the distance between said top and bottom of said band, $e$ is the distance between two adjacent ridges, and $n$ is a whole number. The angle of inclination must also fall between 15° and 30°. The invention also includes a fuel cell comprising a stack of said electrodes.

14 Claims, 1 Drawing Figure

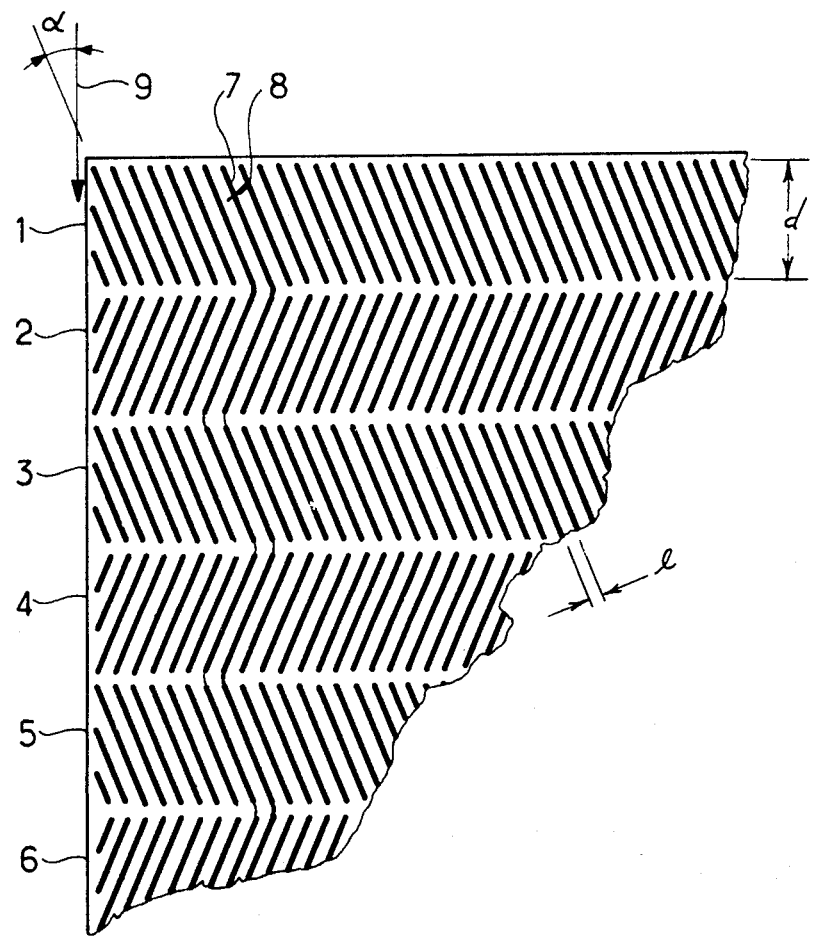

ELECTRODES AND FUEL CELLS

CROSS REFERENCES

U.S. Pat. Nos. 3,511,713; 3,513,032; 3,516,866; and 3,518,122; and U.S. Pat. applications Ser. No. 123,110 and Ser. No. 70,636.

The present invention relates to an improvement in the electrode structures and fuel cells of the type shown and described in U.S. Pat. Nos. 3,511,713, 3,513, 032, 3,516,866, 3,518, 122, and Ser. No. 123,110 filed Mar. 10, 1971 and Ser. No. 70,636 filed Sept. 9, 1970, the disclosure of each of which is hereby incorporated by reference.

Fuel cells in which a reactant is dissolved or otherwise carried in an electrolyte have additionally been described and proposed in French Pat. Nos. 1,379,800, 1,399,765, 1,564,864, and French application PV183127; the foregoing French and U.S. patents describe structures which provide compact fuel cells of substantial output. In general these structures are a stack of individual thin plates or sheets forming electrodes, preferably bi-polar and separated by semi-permeable diaphragms. The fuel cell includes end plates for collecting electric current. The electrodes are held in frames, or are otherwise formed with openings in their marginal portions, as well as with ducts or microgrooves extending from the marginal portions to the faces of the electrodes to carry electrolytic fluid and reactant from a supply to the electrodes to wash across the face of the electrodes from one marginal portion supplying the electrolyte and reactant to the opposed marginal portion in which the electrolyte and spent reactant is collected. The fuel cell includes a system of discharge channels connected with or through one of the said marginal portions of the electrode. The electrolyte which washes the face of the electrode may contain one or more reactants which may be dissolved or emulsified or otherwise carried in the electrolyte. Commonly, different reactants will be applied across each face of the preferred bi-polar electrodes.

Said application Ser. No. 70,636 discloses electrode structures containing projections on the faces of the electrodes. The projections are arranged in a plurality of alternate groups, each group in itself, parallel to the marginal portions of the electrodes from which the electrolyte is fed and is collected. The individual projection within each group comprise an array of elongated ridges parallel to each other and inclined with respect to said marginal portions. The angle of inclination of adjacent groups is approximately equal and the direction of inclination of the ridges in adjacent groups are in alternate direction providing a chevron effect. The plurality of parallel ridges which are characterized as a group or band are generally rectilinear in shape. The angle of inclination of the ridges relative to the flow of fluid is disclosed to be between 0° and 45°. Alternate electrodes in a stack of electrodes forming a fuel cell are oriented in different directions, preferably 180°, to avoid nesting. Said Ser. No. 70,636 discloses that the preferred angle of inclination of the said ridges is 45° and thus providing a substantially equal overall flow direction from one edge of the electrode to the other.

It has now been discovered that when the angle of inclination is 45° as aforesaid, the structure contains the disadvantage that a significant number of the channels which are formed between adjacent ridges, within the rows of rectilinear ridges which abut the side edges of the electrode, are not readily fed and, in fact, may not be fed at all with electrolyte. This reduces the current density that may be obtained in these side zones of the electrode and thereby reduces the average current density obtained over the electrode. The aforementioned disadvantage may be alleviated to some extent in accordance with an embodiment of the invention described in said Ser. No. 70,636 wherein the projections are in the forms of arcs whose chords are parallel to the overall direction of electrolyte flow. Such electrodes, however, exhibit an increased possibility of nesting when they are stacked with consequent damage to the semi-permeable membranes separating them.

It is an object of the present invention to provide electrode structures which may be used to manufacture a fuel cell in which the projections on the electrode are so designed that the electrolyte with the reactants is able to wash across almost the entire surface of the electrode, thus providing an increased current density output and at the same time designing the arrangement of projections so that there is no danger of nesting or jamming when the electrodes are assembled into a fuel cell.

Subject Matter of the Present Invention

Briefly, the electrode structure is a thin nonporous embossed sheet containing a plurality of projections on at least one surface and preferably on both surfaces. The projections are in the form of a plurality of ridges separated by depressions. The plurality of ridges are arranged in bands. Each band occupies an area of said surface which is preferably rectilinear. The top and bottom of each band is substantially parallel to the same ends of the electrode. Those ends of the electrode are marginal portions containing ducts and grooves for supplying electrolyte and reactant to one margin and collecting and withdrawing electroyte and spent reactant from the other. Elongated ridges within each band are parallel to each other and inclined at an angle $\alpha$ with a line normal to and connecting said marginal portions which is the overall direction of fluid flow. The direction of inclination of the ridges in adjacent groups or bands are in alternate directions. The improvement of the present invention is that the angle of inclination $\alpha$ must be such that $d \sin \alpha = n e$ wherein $d$ is the distance between the top and bottom of said band (the width of said band), $e$ is the distance between adjacent ridges in a band, and n is a whole number. The angle of inclination $\alpha$ is also limited in that it must be between 15° and 30°. Thus if the band is 10 mm. and the distance $e$ between two ridges in the same band is 1 mm., the angle $\alpha$ will be 23°35' when $n$ is 4, and will be 17°27' when $n$ is 3.

The limitations imposed upon the angle of inclination $\alpha$ result from the fact that the opposite ends of corresponding ridges on two adjacent bands must be aligned with a straight line parallel to the overall direction of flow.

In the aforedescribed structure there are only very few channels (depressions between adjacent ridges) which are not directly fed with electrolyte from the marginal feed portion of the electrode. This results in a substantial increase in the area of the electrode useful in producing full current with a concommitant increase in current density.

The aforesaid angles of inclination are such that the relative inclination between ridges of adjacent electrodes are sufficiently large so that numerous points of meeting of ridges of adjacent electrodes are present which avoids the risk of nesting and/or jamming during assembly of the fuel cell.

The invention will be described by way of example with reference to the accompanying drawing wherein an electrode surface is schematically illustrated. Six sequential and alternating rectilinear bands 1, 2, 3, 4, 5, and 6 are illustrated. Each of the bands contains a plurality of parallel ridges (projections) 7 separated by depressions 8. When the foregoing structure is embossed on a thin sheet and through the thin sheet to form a bipolar electrode structure, the ridges on one side correspond to the depressions on the other side, and the depressions on one side correspond to the ridges on the other side, respectively.

The overall direction of fluid flow of the electrolyte is illustrated by arrow 9. The angle of inclination $\alpha$ between the said overall direction of fluid flow and the ridges 7 is illustrated. The width of the band is illustrated by $d$ and the distance between adjacent ridges of the bands is illustrated by distance $e$. The angle $\alpha$ is such that $d \sin \alpha = n e$ when $n$ is a small whole number. The angle $\alpha$ is between 15° and 30°. Due to the alternating angle of the ridges on adjacent bands, the angle $\alpha$ alternates on opposite sides of the direction of flow 9.

Although the drawing illustrates an electrode structure in which there is a gap between the ridges and depressions in the adjacent bands, the invention includes the embodiment thereof wherein adjacent bands are extended so that the corresponding ridges in adjacent bands fully abut each other with the result that the corresponding depressions formed between adjacent ridges also fully abut each other and form continuous zig-zag conduits adapted to permit relatively unimpeded flow of fluid from one side of said electrode structure to the other, e.g., from one side of the electrode continuously through the depression 8 in band 1 and through the corresponding abutting depressions in bands 2, 3, 4, 5, and 6 progressively.

In the embodiment of the electrode structure illustrated, $n = 4$. With a band with $d$ of 10 mm. and the distance $e$ of 1 mm., the angle $\alpha$ is 23°35'. As noted hereinbefore, when $n$ is 3 for the same dimensions, the angle $\alpha$ is 17°27'. For practical purposes, these angles may be considered substantially 23°30' and 17°30' respectively.

I claim:

1. In an electrode comprising a thin non-porous embossed sheet,
    said electrode having a plurality of projections on at least one surface thereof,
    said electrode having marginal portions on two opposed sides thereof formed with duct means and grooves adapted to permit electrolyte and reactants to flow across said electrode surface containing said projections from one of said marginal portions to the other,
    the projections formed on the surface of the electrode are arranged in a plurality of bands of projections,
    each band of projections occupying an area of said surface and having the top and bottom of said area substantially parallel to said marginal portions,
    each band of projections comprising an array of elongated ridges parallel to each other and included to form an angle $\alpha$ with a line normal to and connecting said marginal portions, the direction of inclination of the ridges in adjacent bands being in alternating directions,
    the improvement comprising that (i) $d \sin \alpha\ n\ e$ wherein $d$ is the width of said band, $e$ is the distance between adjacent ridges, and $n$ is a whole number, and (ii) said $\alpha$ is between 15° and 30°.

2. The electrode of claim 1 wherein said bands of projections are rectilinear bands containing a plurality or parallel straight ridges.

3. The electrode of claim 2 wherein $d$ is substantially 10 times $e$ and wherein $\alpha$ is substantially 23°30' or 17°30'.

4. The electrode of claim 2 wherein both surfaces of said electrode contain said projections and bands of projections.

5. The electrode of claim 4 wherein said ridges and the depressions formed between said ridges on one surface of said electrode form the corresponding depressions and ridges on the other surface of said electrode.

6. The electrode of claim 5 wherein d is substantially ten times $e$ and wherein $\alpha$ is substantially 23°30' or 17°30'.

7. The electrode of claim 2 wherein the ridges of adjacent bands fully abut each other, whereby the depressions formed between adjacent ridges also fully abut each other and form continuous zig-zag conduits adapted to permit flow of fluid from one of said marginal portions to the other.

8. The electrode of claim 5 wherein the ridges of adjacent bands fully abut each oher, whereby the depressions formed between adjacent ridges also fully abut each other and form continuous zig-zag conduits adapted to permit flow of fluid from one of said marginal portions to the other.

9. A fuel cell comprising an assembly of stacked electrodes alternating with semi-permeable thin sheet diaphragms,
    said electrodes have the structure as characterized in claim 1 hereof,
    said fuel cell containing duct means interconnected with said marginal portions of said electrodes enabling flow of electrolyte and reactants lengthwise of the stack of electrodes to supply electrolyte and reactant to said electrodes to flow and wash over the surfaces of the electrodes.

10. A fuel cell comprising an assembly of stacked electrodes alternating with semi-permeable thin sheet diaphragms,
    said electrodes have the structure as characterized in claim 3 hereof, and adjacent electrodes are oriented so that the projections on adjacent surfaces are at different angles to prevent nesting,
    said fuel cell containing duct means interconnected with said marginal portions of said electrodes enabling flow of electrolyte and reactants lengthwise of the stack of electrodes to supply electrolyte and reactant to said electrodes to flow and wash over the surfaces of the electrodes.

11. A fuel cell comprising an assembly of stacked electrodes alternating with semi-permeable thin sheet diaphragms,
    said electrodes have the structure as characterized in claim 7 hereof, and adjacent electrodes are oriented so that the projections on adjacent surfaces are at different angles to prevent nesting, said fuel cell containing duct means interconnected with said marginal portions of said electrodes enabling flow of electrolyte and reactants lengthwise of the stack of electrodes to supply electrolyte and reactant to said electrodes to flow and wash over the surfaces of the electrodes.

12. A fuel cell comprising an assembly of stacked electrodes alternating with semi-permeable thin sheet diaphragms, said electrodes have the structure as characterized in claim 1 hereof, and adjacent electrodes are oriented 180° to prevent nesting, said fuel cell containing duct means interconnected with said marginal portions of said electrodes enabling flow of electrolyte and reactants lengthwise of the stack of electrodes to supply electrolyte and reactant to said electrodes to flow and wash over the surfaces of the electrodes.

13. A fuel cell comprising an assembly of stacked electrodes alternating with semi-permeable thin sheet diaphragms, said electrodes have the structure as characterized in claim 6 hereof, and adjacent electrodes are oriented 180° to prevent nesting, said fuel cell containing duct means interconnected with said marginal portions of said electrodes enabling flow of electrolyte and reactants lengthwise of the stack of electrodes to supply electrolyte and reactant to said electrodes to flow and wash over the surfaces of the electrodes.

14. A fuel cell comprising an assembly of stacked electrodes alternating with semi-permeable thin sheet diaphragms, said electrodes have the structure as characterized in claim 8 hereof, and adjacent electrodes are oriented 180° to prevent nesting, said fuel cell containing duct means interconnected with said marginal portions of said electrodes enabling flow of electrolyte and reactants lengthwise of the stack of electrodes to supply electrolyte and reactant to said electrodes to flow and wash over the surfaces of the electrodes.

* * * * *